US011050684B2

United States Patent
Jernström

(10) Patent No.: US 11,050,684 B2
(45) Date of Patent: Jun. 29, 2021

(54) METHODS AND APPARATUSES FOR CROSS PLATFORMS CONVERSATIONS THROUGH A BOT FRAMEWORK

(71) Applicant: Telia Company AB, Solna (SE)

(72) Inventor: Maria Jernström, Vega (SE)

(73) Assignee: Telia Company AB, Solna (SE)

( * ) Notice: Subject to any disclaimer, the term of this patent is extended or adjusted under 35 U.S.C. 154(b) by 106 days.

(21) Appl. No.: 15/977,594

(22) Filed: May 11, 2018

(65) Prior Publication Data

US 2018/0331980 A1 Nov. 15, 2018

(30) Foreign Application Priority Data

May 12, 2017 (SE) .................................. 1750586-8

(51) Int. Cl.
| | |
|---|---|
| *H04L 12/58* | (2006.01) |
| *H04L 12/18* | (2006.01) |
| *H04M 1/72436* | (2021.01) |
| *H04L 29/08* | (2006.01) |

(52) U.S. Cl.
CPC .......... *H04L 51/02* (2013.01); *H04L 12/1818* (2013.01); *H04L 51/04* (2013.01); *H04L 51/16* (2013.01); *H04L 67/141* (2013.01); *H04L 67/146* (2013.01); *H04M 1/72436* (2021.01); *H04L 51/36* (2013.01)

(58) Field of Classification Search
CPC ....... H04L 51/02; H04L 51/16; H04L 67/141; H04L 67/146; H04L 12/1818; H04L 51/04; H04L 51/36; H04M 1/72552
See application file for complete search history.

(56) References Cited

U.S. PATENT DOCUMENTS

| | | | |
|---|---|---|---|
| 6,564,261 B1 | 5/2003 | Gudjonsson et al. | |
| 9,043,407 B1 | 5/2015 | Gaulke et al. | |
| 2002/0091832 A1 | 7/2002 | Low et al. | |
| 2009/0006632 A1* | 1/2009 | Ramanathan | H04M 3/2218 709/228 |
| 2009/0253445 A1* | 10/2009 | Bettis | H04L 51/066 455/466 |
| 2010/0191812 A1 | 7/2010 | O'Donovan | |
| 2013/0073636 A1 | 3/2013 | Zhu et al. | |
| 2013/0346513 A1* | 12/2013 | Jia | H04L 12/1813 709/206 |

(Continued)

OTHER PUBLICATIONS

European Search Report, Patent Application No. EP 18 16 9160, dated Oct. 4, 2018; European Patent Office, Munich, Germany.

(Continued)

*Primary Examiner* — Patrice L Winder
*Assistant Examiner* — Aye M Aung
(74) *Attorney, Agent, or Firm* — Burr & Forman LLP; Jeffrey H. Kamenetsky

(57) ABSTRACT

Embodiments herein relate to methods, a chatbot capable framework and a system for allowing a dialogue between user devices using the chatbot framework. A first user device establishes a session with the chatbot framework and starts a dialogue with the framework. The first user devices invites a second user device via the chatbot framework, the second user devices connects to the chatbot framework and accepts the invitation and the chatbot framework allows the dialogue between the user devices and stores a session state in a database.

8 Claims, 7 Drawing Sheets

(56) References Cited

U.S. PATENT DOCUMENTS

| | | | |
|---|---|---|---|
| 2016/0042420 A1* | 2/2016 | Purcell | G06Q 30/0613 |
| | | | 705/26.41 |
| 2016/0094490 A1 | 3/2016 | Li et al. | |
| 2016/0149839 A1* | 5/2016 | Yi | H04L 67/1095 |
| | | | 709/206 |
| 2016/0277335 A1* | 9/2016 | Cheung | H04L 12/1822 |
| 2017/0279745 A1* | 9/2017 | Janajri | H04L 51/043 |
| 2018/0227341 A1* | 8/2018 | Rizzi | H04L 65/403 |

OTHER PUBLICATIONS

Bjork, Ewa; Swedish Search Report, Patent Application No. 1750586-8, dated Nov. 24, 2017; Swedish Patent and Registration Office, Stockholm, Sweden.

* cited by examiner

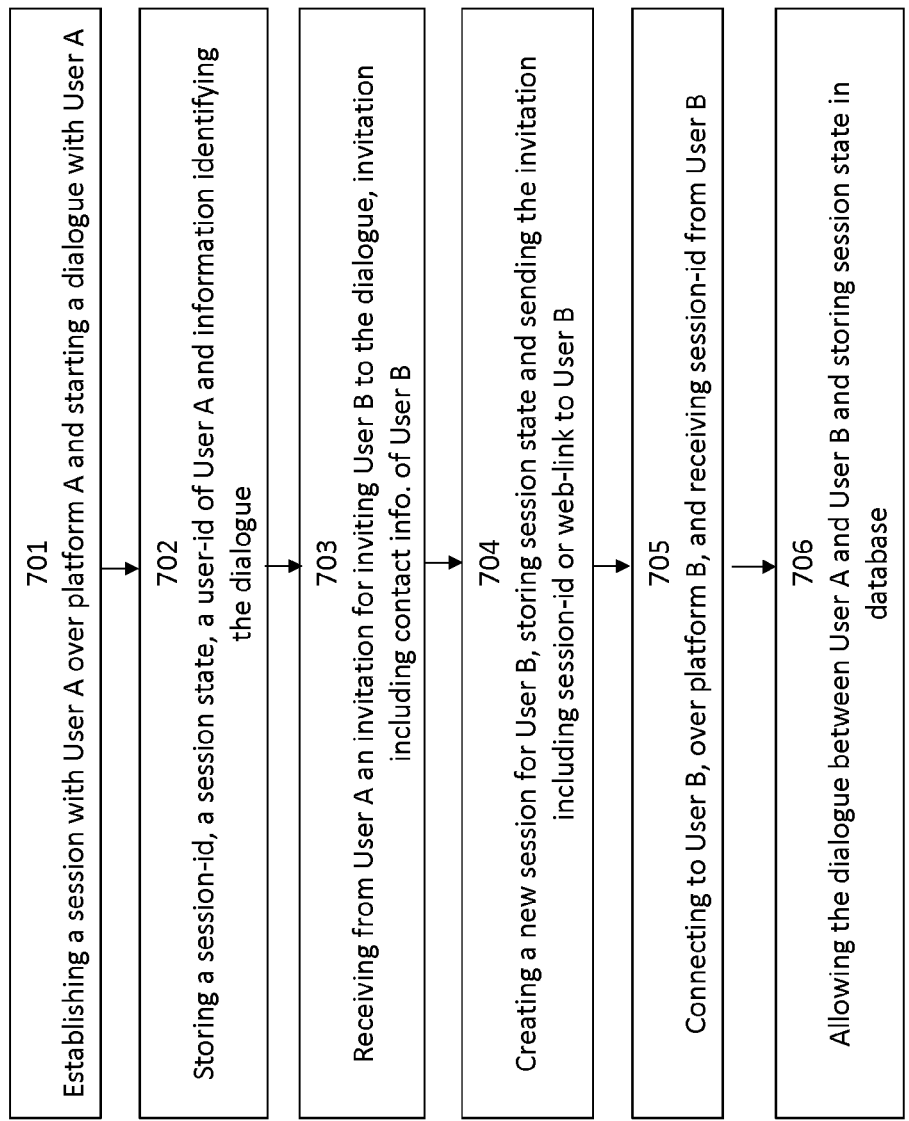

METHODS AND APPARATUSES FOR CROSS PLATFORMS CONVERSATIONS THROUGH A BOT FRAMEWORK

TECHNICAL FIELD

The present disclosure relates to the field of data communications, and in particular to a system, a chatbot capable framework and methods for allowing cross platforms conversations/dialogues through the chatbot capable framework.

BACKGROUND

Chatbots are becoming increasingly popular as an interactive medium for the provision of information. A chatbot is a computer or software agent designed to have conversations with human correspondents. A chatbot is also called an "internet bot", a "web robot", a "www robot" or simply a "bot", a virtual assistant, a virtual client, etc. The computer agent or bot, by means of a processor, includes an application that runs automated tasks (e.g., scripts) over one or several platforms. In a simple example, a chatbot performs tasks that are both simple and are structurally repetitive at a higher rate that would be possible for a human being alone. Chatbots for different chat applications can be developed using a chatbot framework. The bot logic is created once and then deployed to the chatbot platform of choice. A chat platform API (Application Programming Interface) may vary in functionality available for the chatbot framework and the bot needs to be designed for the chat platform.

Given the exceptional speed with which chatbots can perform the relatively simple routines, chatbots may also be implemented where a response speed is faster than of what is required by a human, typically customer service/support or, e.g., finding if a product is in stock. While chatbots are often used to simply automate a repetitive online interaction with a user or human, their ability to mimic actual human conversation for users using a chat platform (e.g., messaging service) or spoken language has made them popular since users often want or require answers directly and quickly without waiting in line or in a queue which is often the case when calling a company support center.

With today's technologies, a user may have access to chat platforms and associated chatbots from a plurality of devices, such as a laptop, a PC, a mobile device, etc. Also, the number of chat platforms are many within one and the same device, and each associated chatbot operates within a specific platform. In other words, two users using different communications platforms may not be able to communicate with each other. Also, different chat platforms have different sets of features, where some allow voice calls and the sending of large files while others do not support the same features. This will mean that the bot in the conversations need to adapt the media in the conversation towards the target platform and if that is not possible, inform the users. However, this leads to a non-satisfactory user experience.

SUMMARY

It is an object of embodiments herein to solve the above problems by providing a method performed in a system, a system, a method performed in a chatbot capable framework and a chatbot capable framework for allowing a dialogue between users using different chat platforms.

According to an aspect of embodiments herein, there is provided a method for allowing a dialogue between user devices using a chatbot capable framework. The method comprising: a first user device establishing a session with the chatbot capable framework over a first chat platform and starting a dialogue with the chatbot capable framework, the session having a session-id. The chatbot capable framework stores, in a database, the session-id, a session state, a user-id of the first user device and information identifying the dialogue. The first user device sends an invitation to the chatbot framework for inviting a second user device to the dialogue. The invitation comprises contact information of the second user device. The chatbot capable framework creates a new session for the second user device, stores the session state, sends the invitation to the second user device and includes in the invitation the session-id or a web-link identifying the session. The second user device establishes the created new session with the chatbot capable framework over a second chat platform; connects to the chatbot capable framework over the second chat platform and accepts the invitation by providing the session-id. The chatbot capable framework allows the dialogue between the first and second user devices by connecting the two sessions, and stores the session state in the database.

According to another aspect of embodiments herein, there is provided a method performed by a chatbot capable framework for allowing a dialogue between user devices. The method comprises establishing a session with a first user device, over a first chat platform, and starting a dialogue with the first user device; storing a session-id of the session, a session state, a user-id of the first user device and information identifying the dialogue; receiving, from the first user device, an invitation for inviting a second user device to the dialogue. The invitation includes information identifying the second user device. The method further comprises creating a new session for the second user device, storing the session state, sending the received invitation to the second user device and including the session-id or a web-link identifying the session in the invitation. The invitation is sent to the second user device over a second chat platform. The method further comprises connecting to the second user device, over the second chat platform, receiving the session-id from the second user device, and allowing the dialogue between the first and second user devices, by connecting the two sessions, and storing the session state in the database.

According to another aspect of embodiments herein, there is also provided a chatbot capable framework for allowing a dialogue between user devices, the chatbot capable framework being configured to: establish a session with a first user device over a first chat platform and start a dialogue with the first user device; store a session-id of the session, a session state, a user-id of the first user device and information identifying the dialogue in a database; receive, from the first user device an invitation for inviting a second user device to the dialogue, the invitation including contact information of second user device; create a new session for the second user device, store the session state, send the invitation to the second user device and include the session-id or a web-link in the invitation; connect to the second user device over a second chat platform, receive the session-id from the second user device; allow the dialogue between the user devices by connecting the two sessions, and store the session state in the database.

According to another aspect, there is provided a system comprising a chatbot capable framework, at least two user devices and a database for allowing a dialogue between the user devices using the chatbot capable framework. In the system, a first user device is configured to establish a session with the chatbot capable framework over a first chat platform and is further configured to start a dialogue (or conversation) having a session-id; the chatbot capable framework is configured to store, in a database, the session-id, a session state, a user-id of the first user device and information identifying the dialogue; the first user device is configured to send an invitation to the chatbot capable framework for inviting the second user device to the dialogue, the invitation including contact information of the second user device; the chatbot capable framework is configured to create a new session for the second user device, to store the session state, to send the invitation to the second user device and to include the session-id or a web-link in the invitation; the second user device is configured to establish the created session with the chatbot capable framework, over a second chat platform to connect to the chatbot capable framework over the second chat platform, and to accept the invitation by providing the session-id; the chatbot capable framework is configured to allow the dialogue between the first and second user devices by connecting the two sessions, and to store the session state in the database.

An advantage with the embodiments herein is to allow users of different platforms to start conversations or dialogues with each other through a bot framework.

Another advantage with the embodiments herein is to provide a mechanism for making sure that the users that want to join a conversation or a dialogue are approved. This is performed in order to avoid eavesdropping.

BRIEF DESCRIPTION OF THE DRAWINGS

Example of embodiments herein are described in more detail with reference to the attached drawings in which:

FIG. 7 illustrates a flowchart of a method performed by a chatbot capable framework, according to an embodiment herein.

DETAILED DESCRIPTION

In the following, a detailed description of the exemplary embodiments is presented in conjunction with the drawings to enable easier understanding of the solutions(s) described herein.

Figure 1:
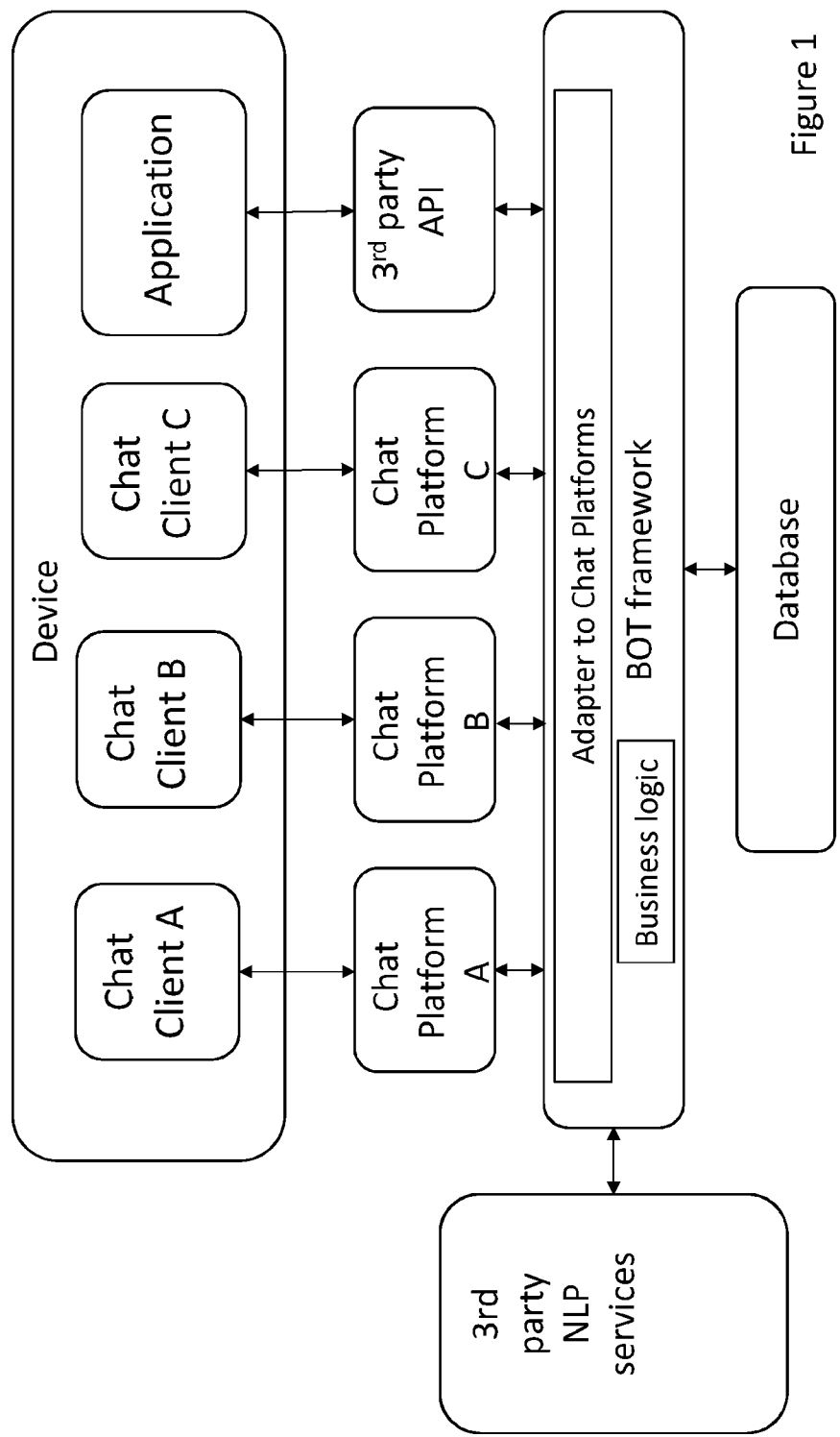
FIG. 1 illustrates a schematic overview of bot platforms.

Referring to FIG. 1, there is illustrated a schematic block diagram showing bot platforms. In general, a bot (or chatbot) logic is hosted by a "bot framework" that has so called "web hooks" on an API for supported chat platform(s). In general, a web hook allows the bot framework to interact with the user and also be able to use third party sources to utilize NLP (Natural Language Processing) platforms to add intelligence to the bot communication logic. As shown in FIG. 1, a device may comprise a plurality of chat clients denoted chat client A, B, and C. The device is also shown including an application used to interface with a third party API for other communication platforms such as SMS (Short Message Service), e-mail or social media. Each chat client may interface with a respective chat platform (chat platform A, B, C respectively). Third party ($3^{rd}$) party NLP services may also interact with the bot framework via an adapter to chat platforms A, B, C. A database is also shown interfacing with the adapter and also a business logic.

Figure 2:
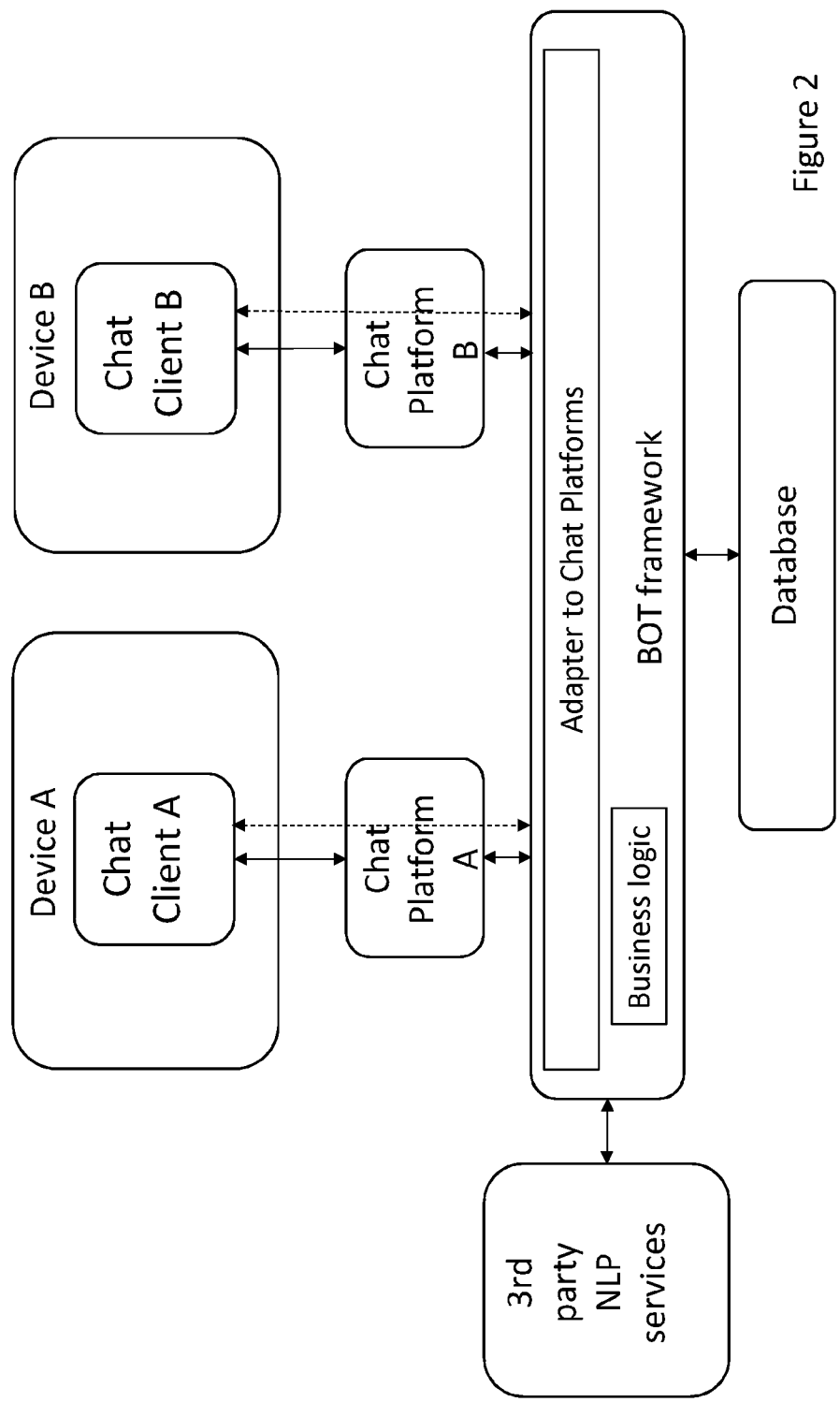
FIG. 2 shows the bridging of different chat platforms.

FIG. 2 shows the bridging of different chat platforms. Here, two devices are shown (Device A and Device B) each interfacing with a respective chat platform (A, B respectively). The dashed arrows from the devices to the bot framework shows joining a bot dialogue between the chat platforms A and B. In this example, each device is provided with a chat application which may be with different techniques or suppliers. The dashed arrows show a possibility to create an interaction to make it possible to join, transfer and continue chat dialogues between different chat platforms. For example, a user of device A initiates the joining of an ongoing session or dialogue between chat client A over chat platform A by typing a command or clicking a button. The bot framework or business logic responds with a code valid for another chat platform for chat client B of device B, and the user of device B initiates a new session with chat client B, inputs the code received earlier and can thereafter continue the dialogue where it stopped.

Figure 3:
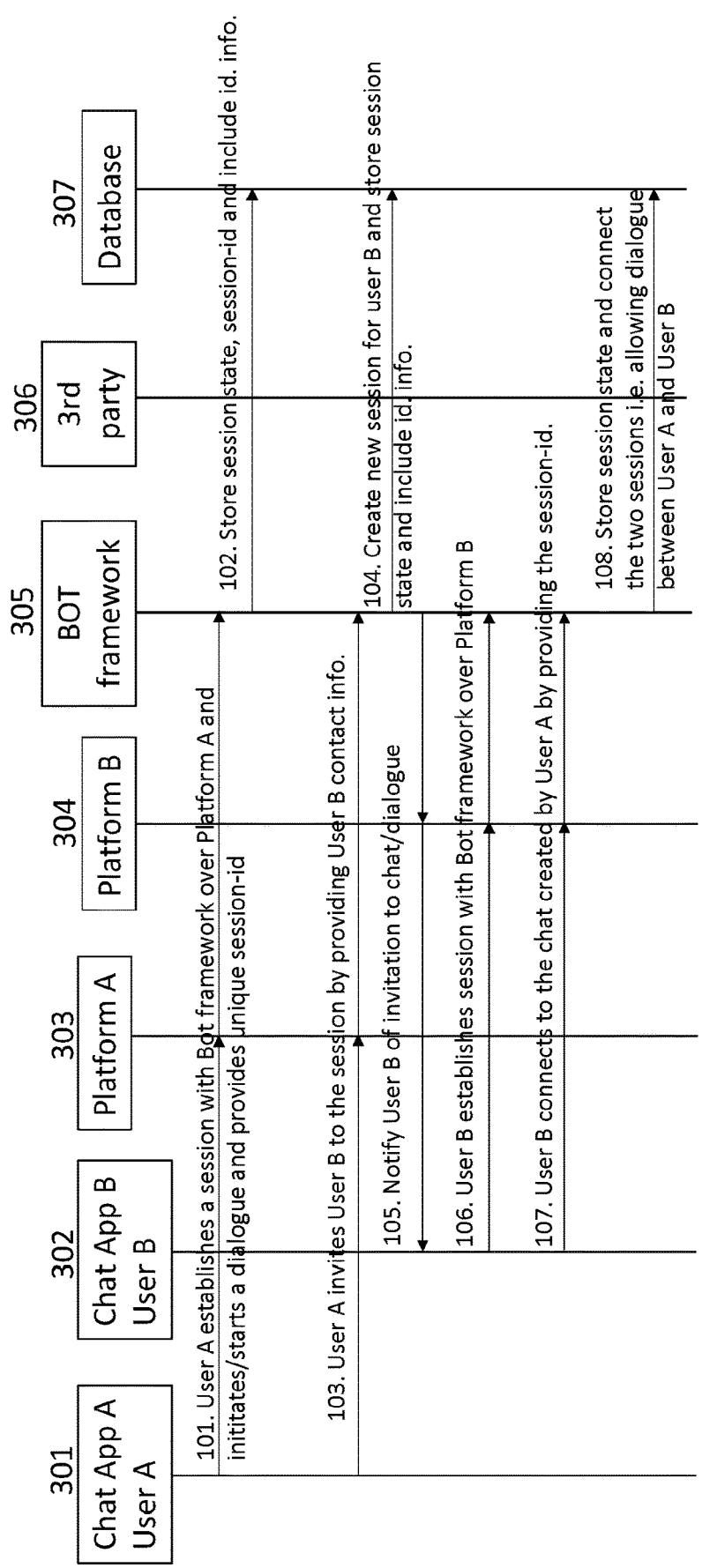
FIG. 3 is an example of a diagram depicting bridging of a dialogue involving invitation of users to a chat, according to an embodiment herein.

Referring to FIG. 3, there is illustrated a diagram depicting bridging of a dialogue involving invitation of users to a chat in a system according to embodiments herein. The diagram shows how a first user device starts a dialogue with a chatbot capable framework over a first chat platform and invites a second user device to join the dialogue.

It is here assumed that the first user device, denoted User A, hosts chat application A 301 and the second user device, denoted User B, hosts chat application B 302. It should be mentioned that each user may have several devices, e.g., a PC hosting chat application A, and a mobile device hosting chat application B. To each chat platform is associated a chat application. Here, the first chat application platform, denoted Platform A 303, is associated with the first chat application A 301. The second chat application platform, denoted Platform B 304, is associated with the second chat application B 302. A chat platform may be viewed as a chat supported application, e.g., a messaging platform with APIs that can be hooked into for a chatbot logic to use.

The system also shows a chatbot capable framework 305, a $3^{rd}$ party service (e.g., NLP service) (optional) 306 and a database 307. The chatbot capable framework 305 may be executed by a processor or an (application) server or a set of servers in a network.

The actions performed include:

(101) User A being configured to establish, using chat application A 301, a session with the chatbot capable framework 305 over chat platform A 303 that is associated with chat application A 301. User A is also configured to start a dialogue with the chatbot capable framework 305 on, e.g., a chosen topic, the dialogue having a session-id which is unique. The session-id is communicated to the chatbot capable framework 305.

(102) The chatbot capable framework 305 is configured to store the session-id and a state of the session in database 307, wherein the session state includes identification information (id. info.) identifying the ongoing dialogue. The identification information may be generated or constructed by the chatbot framework 305. The identification information may include, user id., timestamp, message sequence id, contextual information regarding a content of the dialogue, a timer for validity indicating how long a session is valid to be picked-up again before removed, etc. The identification information may be constructed with a crypto hash to create a unique identifier.

(103) User A is configured to send an invitation to the chatbot capable framework 305, over platform A 303, for inviting User B to the dialogue or chat. The invitation includes contact information of user B.

(104) The chatbot framework 305 is configured to retrieve from the database the stored session-id or a web-link, to create a new session for User B. The chatbot capable framework 305 may further store the session state and include additional information, e.g., the session-id of the new session. Note that creating a new session is meant to mean setting up a new session for User B.

(105) The chatbot framework 305 is configured to send the invitation to User B, over chat platform B 304. Hence, the chatbot capable framework 305 notifies User B of the invitation to the chat of User A. If user B is already a user of the chatbot capable framework 305, the notification/invitation is sent from the chatbot framework 305 over platform B 304 to User B.

(106) User B is configured to establish the new (created) session with the chatbot framework 305 over chat platform B 304. Hence, bot framework 305 notifies User B of the invitation to the chat or dialogue.

(107) User B is also configured to connect to the chatbot capable framework 305 over platform B 304 and accept the invitation by providing the session-id to connect to the session of User A.

(108) The chatbot capable framework 305 is configured to allow the dialogue between User A and User B by connecting the two sessions (over session-id) and stores the session state in the database 307. Note here that User A is configured to stay on platform A 303 and can communicate with User B over platform B 303.

Figure 4:
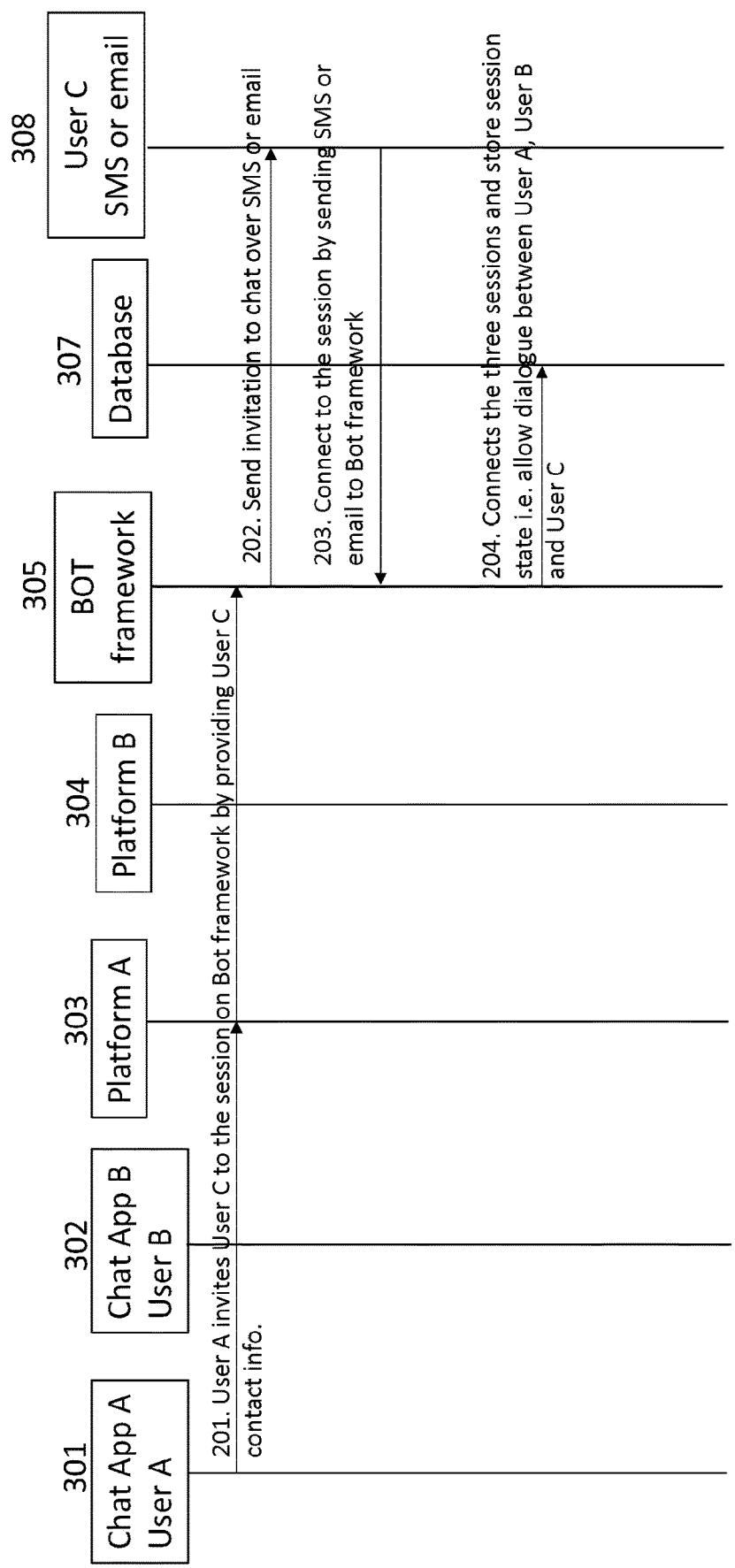
FIG. 4 is an example of a diagram depicting bridging of a dialogue involving invitation of a user to the chat using SMS, according to another embodiment herein.

Referring to FIG. 4, there is illustrated an example of a method or diagram where yet another user, denoted as User C, is invited to the dialogue between User A and User B, according to an embodiment herein. It is here assumed that User A invites User C to the dialogue. FIG. 4 may be viewed as a continuation of FIG. 3 and therefore the actions (of FIG. 3) involving User B are not shown. The $3^{rd}$ party service is also not shown.

(201) User A is configured to send an invitation to the chatbot capable framework 305, over platform A 303, for inviting User C. Here, User C does not use platform A or platform B. Instead user C uses a SMS or e-mail as a platform 308 for receiving the invitation and also for confirming the invitation. The invitation includes User C contact information.

(202) The chatbot capable framework 305 is configured to send the invitation to the dialogue to User C over a SMS or an e-mail and includes in the invitation, the session-id. The information may include a web-link, or a dedicated E.164 number.

(203) User C is configured to connect to the dialogue by sending a confirmation in the form of a SMS or an e-mail to the chatbot capable framework 305 and provides the session-id to identify the dialogue.

(204) The chatbot capable framework 305 is configured to allow the dialogue, i.e., connect the sessions, and to store the session state in the database 307. Hence, the chatbot framework 305 connects the three sessions enabling User A, User B and User C to have a dialogue in-between.

Figure 5:
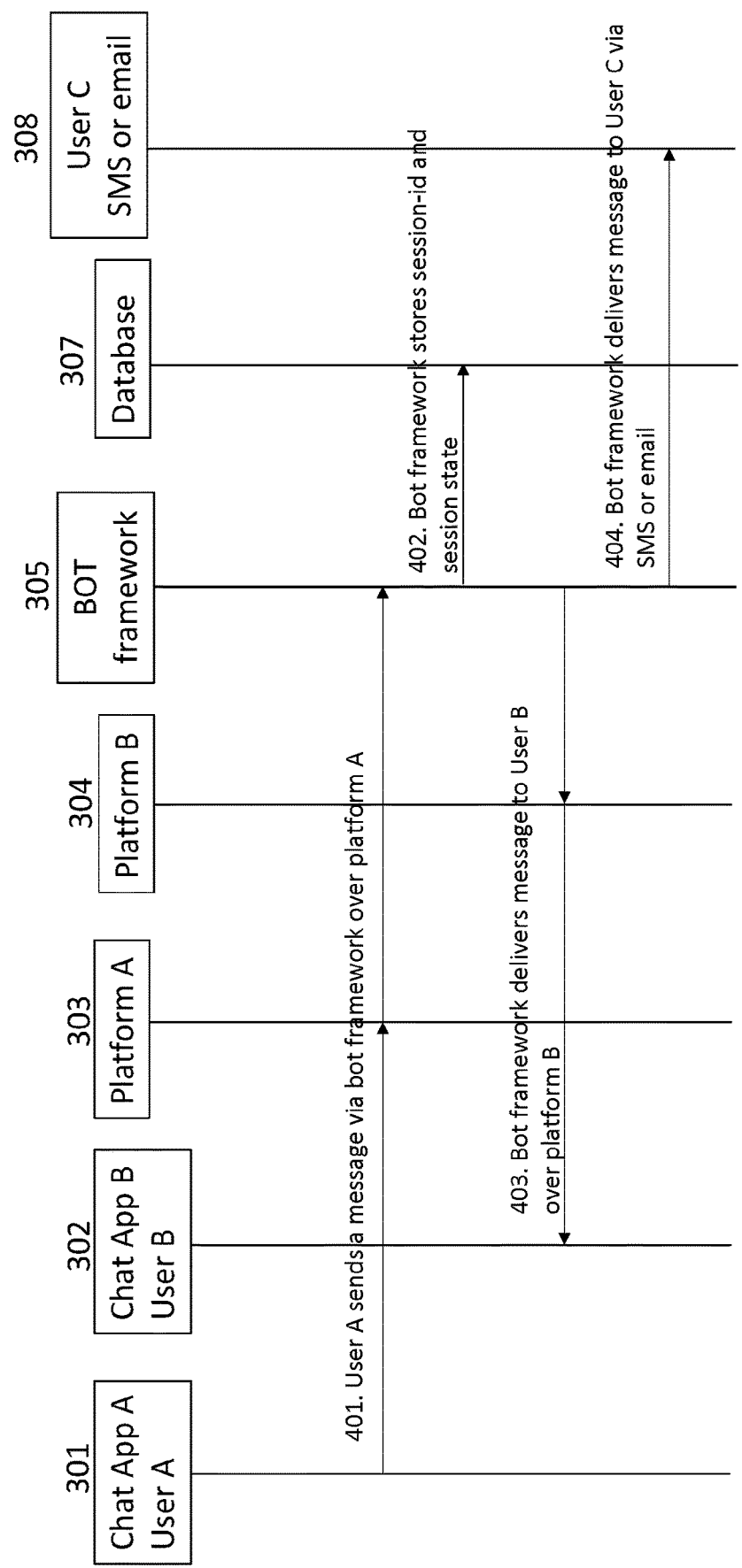
FIG. 5 illustrates an example scenario of delivery of chat messages to users.

FIG. 5 shows how delivery of a message of the dialogue is performed via or over the chatbot capable framework 305.

(401) User A is configured to send the message over chat platform A 303 to the group dialogue over or via the chatbot capable framework 305. User A may also provide the session-id to the chatbot capable framework 305. Note that User A does not need to send the session-id for an ongoing dialogue since both User A and the chatbot capable framework 305 already have that information. However, the provision of the session-id is preferably done for each new dialogue. Further, provision of a session-id, which is unique, guarantees the privacy of the users involved in the dialogue thereby avoiding eavesdropping on the dialogue or conversation. The messages belonging to the dialogue may be encrypted and only the involved parties have the correct decryption key or mechanism for viewing and responding to the messages.

(402) The chatbot capable framework 305 is configured to store the session-id and a session state in the database 307. The message may also be given a timestamp and a message sequence id. This makes it easier to retrieve the message from the database when needed.

(403) The chatbot capable framework 305 is configured to deliver the message, over platform B 304, to User B. Platform B 304 or the chatbot capable framework 305 may format the received message or content of the dialogue to the format supported by chat application B 302 that User B is using.

(404) The chatbot capable framework 305 is configured to deliver the message, using SMS or e-mail, to User C.

Figure 6:
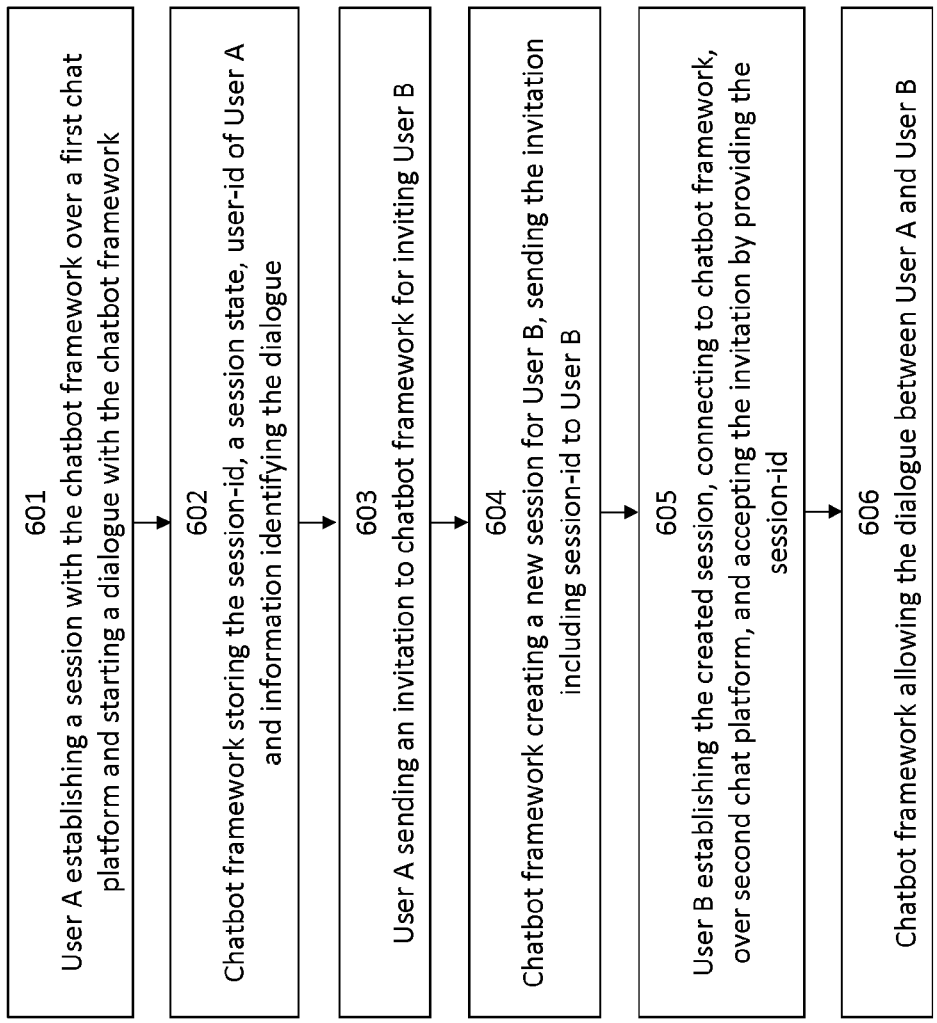
FIG. 6 illustrates a flowchart of a method in a system according to an embodiment herein.

Referring to FIG. 6, there is depicted a flowchart of a method, in a system, for allowing a dialogue between user devices using a chatbot capable framework according to previously described embodiments. The main steps of the method comprise:

(601) User A establishing a session with the chatbot capable framework 305 over a first chat platform 303 associated with a first chat application 301, and starting a dialogue (or conversation or chat) with the chatbot capable framework 305.

(602) The chatbot capable platform 305 stores the session-id, the user-id of User A, a session state and information identifying the dialogue.

(603) User A sends an invitation to the chatbot framework 305 for inviting User B. The invitation includes the contact information of User B.

(604) The chatbot capable framework 305 creates a new session for User B, stores the session state, and sends the invitation including the session-id (or a web-link) to User B.

(605) User B establishes the created session with the chatbot capable framework 305, over a second chat platform 304, connects to the chatbot framework 305 over the second chat platform 304 associated with a second chat application 302, and accepts the invitation by providing the session-id. Note here that User B establishes a session with the chatbot framework and inputs the session-id for joining the dialogue over the second chat platform.

(606) The chatbot capable framework 305 allows the dialogue between User A and User B, by connecting the two sessions, and storing the session state. The chatbot capable framework 305 thus connects the two sessions (session of User A with session of User B).

Referring to FIG. 7, there is illustrated a flowchart of a method performed by the chatbot capable framework 305 according to previously described embodiments.

(701) Establishing a session with User A over a first chat platform associated with a first chat application and starting a dialogue with User A.

(702) Storing a session-id that is unique to the session in a database. The session state, the user-id of User A and information identifying the dialogue are also stored in the database. Information identifying the dialogue may be a timestamp, topic of the dialogue, sequence-id for each message of the dialogue etc.

(703) Receiving from User A an invitation for inviting User B to the dialogue, the invitation includes the contact information of User B.

(704) Creating a new session for User B, storing the session state and sending the invitation including the stored session-id or a web-link identifying the session, to User B.

(705) Connecting to User B, over the second chat platform used by User B, and receiving the session-id from User B.

(706) Allowing the dialogue between User A and User B by connecting the two sessions and storing the session state in the database.

As previously described, yet another user (User C) may join the dialogue in response to an invitation from User A or User B. Assuming that User A has the contact information of User C, User A invites (over Platform A) User C to the dialogue over the chatbot capable framework by providing to the framework User C contact information. The chatbot capable framework sends the invitation to User C and includes the information needed which may be a web-link, a session-id, a E-164 number, etc. User C does not need not be a user of platform A or Platform B. The invitation to User C is sent over SMS or an e-mail. User C then connects to the session or dialogue by sending an SMS or an e-mail to the chatbot capable framework and provides the session-id to the chatbot framework in order to identify the dialogue. The chatbot framework allows the dialogue between the involved parties by connecting the three sessions (of User A, User B and User C) and stores the session state in the database.

There is also provided a chatbot capable framework 305 that can be controlled by a processor or an application server or servers, the chatbot capable framework being configured to: establish a session with a User A over a first chat platform and start a dialogue with User A; store a session-id of the session, a session state, a user-id of User A and information identifying the dialogue in a database; receive, from User A an invitation for inviting User B to the dialogue, the invitation including contact information of User B; send the invitation to User B and include the session-id or a web-link in the invitation; connect to User B over a second chat platform, and receive the session-id from User B; and allow the dialogue between the User A and User B, and store the session state in the database.

Note that the users may ask the chatbot capable framework 305 to perform other tasks such as send notifications about events, make a table reservation at a restaurant, find tickets for a concert or a movie, and/or find a suitable time for a face-to-face meeting etc.

Additional embodiments have already been described and need not be repeated.

The described embodiments of the present invention can be realized in hardware, software, or a combination of hardware and software. A system can be realized in a centralized fashion in one computer system, or in a distributed fashion where different elements are spread across several interconnected computer systems. Any kind of computer system or other apparatus adapted for carrying out the methods described herein is suited. For example, the chatbot capable framework may be controlled by a processor of a computer system of an application server. The computer program when being loaded and executed by the processor carries out the method described herein.

Each computer system may include, inter alia, one or more computers and at least a signal bearing medium allowing a computer to read data, instructions, messages or message packets, and other signal bearing information from the signal bearing medium. The signal bearing medium may include non-volatile memory, such as ROM (Read Only Memory), Flash memory, Disk drive memory, CD-ROM, and other permanent storage. Additionally, a computer medium may include, for example, volatile storage such as RAM (Random Access Memory), buffers, cache memory, and network circuits. Furthermore, the signal bearing medium may comprise signal bearing information in a transitory state medium such as a network link and/or a network interface, including a wired network or a wireless network, that allow a computer to read such signal bearing information.

Throughout this disclosure, the word "comprise" or "comprising" has been used in a non-limiting sense, i.e. meaning "consist at least of." Although specific terms may be employed herein, they are used in a generic and descriptive sense only and not for purposes of limitation. In particular, the embodiments herein may be applicable is any wired or wireless systems, including 3G, 4G, 5G, WiMax etc.

The invention claimed is:

1. A method for allowing a dialogue between user devices using a chatbot capable framework, the method comprising:
    a first user device establishing a session with the chatbot capable framework over a first chat platform and starting at least one of a dialogue and a conversation having a session-id;
    the chatbot capable framework storing, in a database, the session-id, a session state, a user-id of the first user device and information identifying the dialogue;
    the first user device sending an invitation to the chatbot capable framework for inviting a second user device to the dialogue, the invitation including contact information of the second user device;
    the chatbot capable framework creating a new session for the second user device, storing the session state, sending the invitation to the second user device and including the session-id or a web-link in the invitation;
    the second user device establishing the new session with the chatbot capable framework over a second chat platform, connecting to the chatbot capable framework over the second chat platform, and accepting the invitation by providing the session-id, the second chat platform being different from the first chat platform;
    the chatbot capable framework allowing the dialogue between the first and second user devices by connecting the two sessions, and storing the session state in the database;
    the first user device sending an invitation to the chatbot capable framework for inviting a third user device to the dialogue, the invitation including contact information of the third user device;
    the chatbot capable framework sending the invitation over a Short Message Service, SMS, or an e-mail to the third user device and including the session-id in the invitation;
    the third user device connecting to the dialogue by sending a SMS or an e-mail to the chatbot capable framework and providing the session-id to identify the dialogue; and the chatbot capable framework allowing the dialogue between the three user devices and storing the session state in the database.

2. The method according to claim 1, further comprising:
the first user device sending a message pertaining to the dialogue over the first chat platform to the chatbot capable framework;
the chat capable framework delivering the message over the second platform to the second user device; and
the chat capable framework delivering the message over SMS or e-mail to the third user device.

3. A method performed by a chatbot capable framework for allowing a dialogue between user devices, the method comprising:
establishing a session with a first user device over a first chat platform and starting a dialogue with the first user device;
storing a session-id of the session, a session state, a user-id of the first user device and information identifying the dialogue in a database;
receiving, from the first user device an invitation for inviting a second user device to the dialogue, the invitation including contact information of the second user device;
creating a new session for the second user device, storing the session state, sending the invitation to the second user device and including the session-id or a web-link in the invitation;
connecting to the second user device over a second chat platform and receiving from the second user device an acceptance of the invitation including the session-id; the second chat platform being different from the first chat platform;
allowing the dialogue between the first and second user devices by connecting the two sessions, and storing the session state in the database;
receiving, from the first user device, an invitation for inviting a third user device to the dialogue, the invitation including contact information of the third user device;
sending the invitation over a Short Message Service, SMS, or an e-mail to the third user device and including the session-id in the invitation;
receiving, from the third user device, a SMS or an email and the session-id to identify the dialogue; and
allowing the dialogue between the three user devices, and storing the session state in the database.

4. The method according to claim 3, further comprising:
receiving, from the first user device, a message pertaining to the dialogue over the first chat platform;
delivering the message over the second platform to the second user device; and delivering the message, over SMS or e-mail, to the third user device.

5. A system comprising a chatbot capable framework for allowing a dialogue between user devices, the system further comprising a first user device, a second user device, and a third user device, wherein:
the first user device is configured to establish a session with the chatbot capable framework over a first chat platform and is further configured to start at least one of a dialogue and a conversation having a session-id;
the chatbot capable framework is configured to store, in a database, the session-id, a session state, a user-id of the first user device and information identifying the dialogue;
the first user device is configured to send an invitation to the chatbot capable framework for inviting the second user device to the dialogue, the invitation includes contact information of the second user device;
the chatbot capable framework is configured to create a new session for the second user device, to store the session state, to send the invitation to the second user device and to include the session-id or a web-link in the invitation;
the second user device is configured to establish the created session with the chatbot capable framework over a second chat platform, to connect to the chatbot capable framework over the second chat platform, and to accept the invitation by providing the session-id, the second chat platform being different from the first chat platform;
the chatbot capable framework is configured to allow the dialogue between the first and second user devices by connecting the two sessions, and to store the session state in the database;
the first user device is configured to send an invitation to the chatbot capable framework for inviting the third user device to the dialogue, the invitation including contact information of the third user device;
the chatbot capable framework is configured to send the invitation over a Short Message Service, SMS or an e-mail to the third user device and to include the session-id in the invitation; and
the third user device is configured to connect to the dialogue by sending a SMS or an e-mail to the chatbot capable framework and to provide the session-id to identify the dialogue; and the chatbot capable framework is configured to allow the dialogue between the three user devices, and to store the session state in the database.

6. The system according to claim 5, wherein:
the first user device is configured to send a message pertaining to the dialogue over the first chat platform to the chatbot capable framework;
the chatbot capable framework is configured to deliver the message over the second platform to the second user device; and
the chatbot capable framework is configured to deliver the message over SMS or e-mail to the third user device.

7. A chatbot capable framework for allowing a dialogue between user devices, the chatbot capable framework being configured to:
establish a session with a first user device over a first chat platform and start a dialogue with the first user device;
store a session-id of the session, a session state, a user-id of the first user device and information identifying the dialogue in a database;
receive, from the first user device an invitation for inviting a second user device to the dialogue, the invitation including contact information of the second user device;
create a new session for the second user device, store the session state, send the invitation to the second user device and include the session-id or a web-link in the invitation;
connect to the second user device over a second chat platform, and receive from the second user device an acceptance of the invitation including the session-id; the second chat platform being different from the first chat platform;
allow the dialogue between the first and second user devices by connecting the two sessions, and store the session state in the database;

receive, from the first user device, an invitation for inviting a third user device to the dialogue, the invitation including contact information of the third user device;

send the invitation over a Short Message Service, SMS, or an e-mail to the third user device and include the session-id in the invitation;

receive, from the third user device, a SMS or an email and the session-id to identify the dialogue; and allow the dialogue between the three user devices, and store the session state in the database.

8. The chatbot capable framework according to claim 7, further configured to:

receive, from the first user device, a message pertaining to the dialogue over the first chat platform;

deliver the message over the second platform to the second user device; and deliver the message over SMS or e-mail to the third user device.

* * * * *